United States Patent [19]

Cornish

[11] Patent Number: 4,702,894
[45] Date of Patent: Oct. 27, 1987

[54] HYDROGEN SUPPLY UNIT

[76] Inventor: Francois P. Cornish, "Uitentuis", Steynsrus Road, Somerset West, Cape Province, South Africa

[21] Appl. No.: 4,310

[22] Filed: Jan. 7, 1987

Related U.S. Application Data

[63] Continuation of Ser. No. 790,361, Oct. 23, 1985, abandoned, which is a continuation of Ser. No. 332,803, Dec. 21, 1981, abandoned.

[30] Foreign Application Priority Data

Dec. 22, 1980 [ZA] South Africa .............. 80/8007

[51] Int. Cl.$^4$ .............................................. B01J 19/08
[52] U.S. Cl. .................................. 422/186.26; 48/61; 48/65; 123/DIG. 12; 422/186; 422/186.04
[58] Field of Search ...................... 48/61, 65; 422/186, 422/187, 199, 186.26, 186.04; 204/164, 58; 123/3, DIG. 12; 423/657

[56] References Cited

U.S. PATENT DOCUMENTS

| | | | |
|---|---|---|---|
| 1,249,151 | 12/1917 | McKee | 422/186.26 |
| 3,224,952 | 12/1965 | Via Loron | 422/186.26 |
| 3,540,854 | 11/1970 | Brooke et al. | 423/657 |
| 3,648,668 | 3/1972 | Pochero | 123/DIG. 12 |
| 4,344,831 | 8/1982 | Weber | 123/DIG. 12 |

Primary Examiner—Peter Kratz
Attorney, Agent, or Firm—Cushman, Darby & Cushman

[57] ABSTRACT

Hydrogen is generated by heating a metal surface under water to a temperature at which the metal reacts with water to produce hydrogen. The hydrogen can then be used, for example, as a fuel for a motor vehicle engine or another type of engine. The heating can be done electrically by providing an electrical discharge, under water, between the metal surface and another surface. Water and the metal surface are consumed.

7 Claims, 2 Drawing Figures

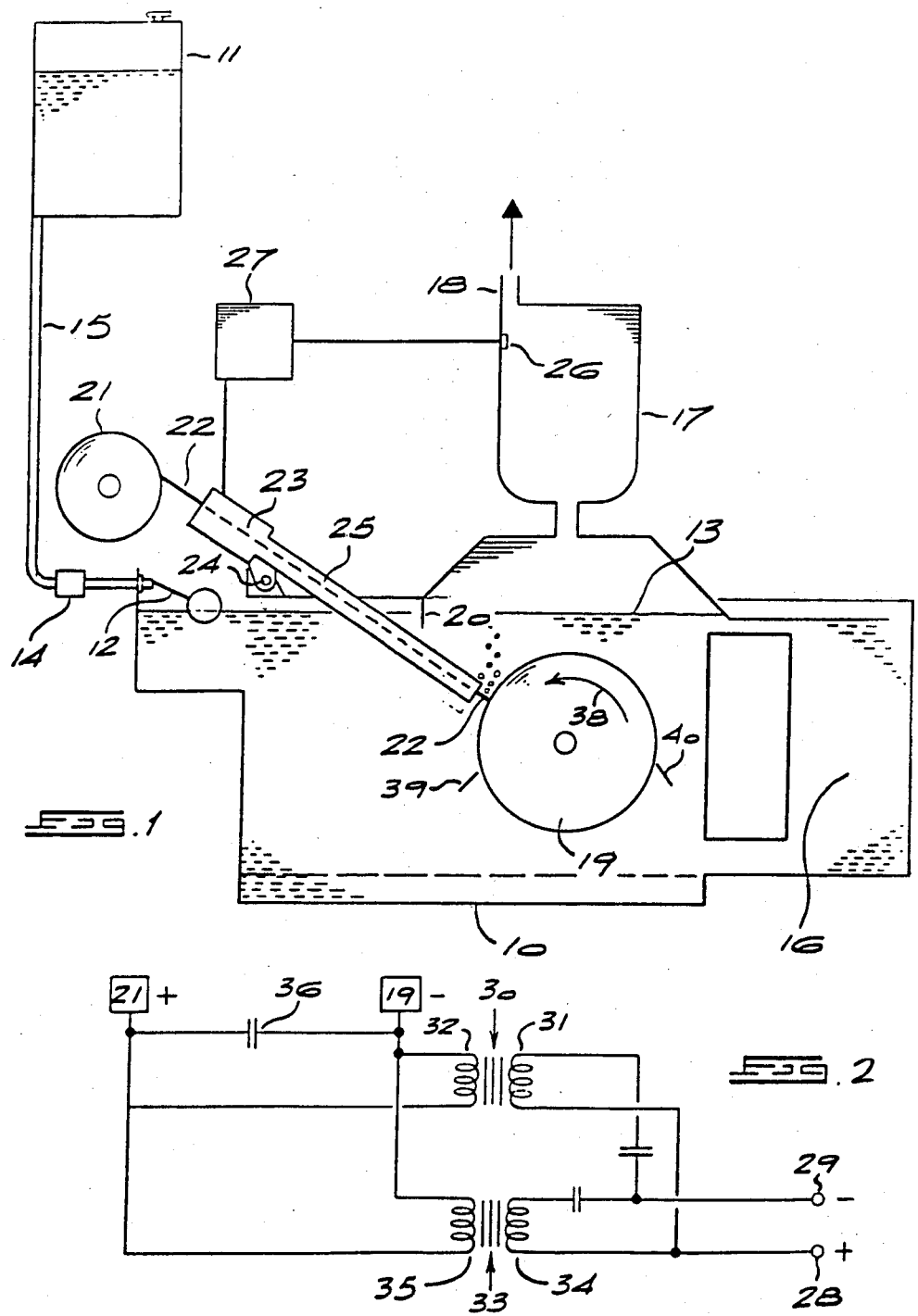

HYDROGEN SUPPLY UNIT

This is a continuation of application Ser. No. 790,361, filed Oct. 23, 1985, which was abandoned upon the filing thereof, which is a continuation of application Ser. No. 332,803, filed Dec. 21, 1981, now abandoned.

BACKGROUND OF THE INVENTION

This invention relates to hydrogen generation.

It has already been proposed to replace conventional fuels with hydrogen in the running of internal combustion engines. Conventional proposals are to produce hydrogen by the electrolysis of water and then to store the hydrogen in some form or another. No economically viable storage system for the highly explosive hydrogen gas has yet been evolved. Whatever system is evolved would involve fairly massive tanks of some kind or another and precautions to prevent explosions.

The present invention is based on the desire of the inventor to be able to provide hydrogen on demand from materials which are in themselves safe to handle.

SUMMARY OF THE INVENTION

According to the invention a method of generating hydrogen comprises the steps of exposing a fresh metal surface to water and heating the interface between the metal surface and the water at least to the lowest temperature at which the metal reacts with water to form a metal oxide and hydrogen, the metal being chosen from metals which are higher in the electromotive series than hydrogen and having stable and safe handling characteristics.

Preferably the metal surface is exposed and the interface heated by pressing an electrode of the relevant metal against a second electrode under water and applying a high voltage between the electrodes while, preferably, moving the electrode surfaces relatively to one another.

In other words in the preferred form of the invention hydrogen is formed by creating an underwater electrical discharge between two electrodes at least one of which is made of a metal as defined above.

The electrical discharge and the relative movement between the electrode surfaces ensure that fresh metal surfaces are exposed to the water while at the same time the discharge heats the interface between the electrodes and the water to the required temperature at which the metal reacts with water to form its oxide and to liberate hydrogen.

Also in the preferred form of the invention the metal is aluminum which has the advantage that it is in relatively abundant supply, relatively cheap, is formed with a protective oxide layer on its exposed surfaces and reacts with water at a relatively low temperature. Aluminum wire fed against a rotating aluminum drum has been found to give excellent results to provide hydrogen for powering small internal combustion engines.

A convenient way of securing the high voltage required is to employ the conventional distributor and coil arrangement which provides the sparking for an internal combustion engine. Two coils in parallel fed from a common distributor has been found to give excellent results. Other methods of generating high voltages from the battery or the drive shaft of an internal combustion engine may also be used.

The method of the invention lends itself in an excellent manner to supply hydrogen on demand. In this case hydrogen is fed to a small buffer store and as the pressure in the store exceeds a predetermined level, the electrodes are separated so that hydrogen generation is interrupted. As the pressure drops to a certain level the electrodes are again fed towards one another.

BRIEF DESCRIPTION OF THE DRAWING

The invention will now be further described, by way of example, with reference to the accompanying drawing, in which:

FIG. 1 is a schematic representation of apparatus for generating hydrogen, and suitable for powering a motor vehicle; and FIG. 2 shows a portion of an appropriate electrical circuit.

DESCRIPTION OF A PREFERRED EMBODIMENT

In the illustrated embodiment there is a generating tank 10 fed with water from a reservoir tank 11 through a float valve 12 to keep the water level 13 in the tank 10 substantially constant. When the apparatus is used in a motor vehicle, the tank 11 can take the place of the conventional fuel tank of the vehicle with a pump 14 in the line 15 to pump more water into the tank 10 when the position of the float 12 indicates that this is required. Water is consumed as hydrogen is generated, and so the tank 11 has to be periodically refilled. The generating tank 10 is in communication with an air cooled heat exchanger 16, which may take the same form as a conventional motor car radiator.

The generating tank 10 is surmounted by a collecting vessel 17 from which hydrogen is drawn through a restricted orifice 18 of an internal combustion engine. Inside the tank 10 there is a drum 19 driven by any suitable means to rotate at a constant speed. The drum 19 is made of aluminum. A depending flange 20 provides a water seal to the top left hand corner of the tank 10, so that that corner is not in gas communication with the vessel 17.

A coil 21 of aluminum wire 22 is fed through a push-pull unit 23 of the kind used to feed welding wire to argon arc welding devices. The unit 23 is arranged to feed the wire against the surface of the drum 19 and to traverse the wire along the length of the drum on a bar 24. The wire passes along an insulating sleeve 25 which enters the tank 10 through a suitable wiper seal.

In the vessel 17 there is a pressure sensor 26 connected to a control unit 27. When the pressure sensor senses a pressure above a predetermined value, it signals the control unit 27 which in turn stops the unit 23 so that wire is no longer fed towards the drum 19. When the pressure drops again, feeding is resumed.

In use, the coil 21 is connected to the high tension side of two ignition coils or transformers 30 and 33. These transformers have primary windings 31 and 34 and secondary, high tension windings 32 and 35. A capacitor 36 is connected across the high tension connections. The terminals 28 and 29 are connected to a conventional vehicle battery.

At the point of contact between the end of the wire 22 and the drum 19 an electrical discharge takes place. As a result the adjacent metal surfaces are heated to a high temperature, the protective oxide film which naturally forms on exposed aluminium surfaces is disrupted, and the exposed aluminium surfaces react with the water. In fact the electrochemical situation at the interface is such that the wire 22 is consumed, with the following reaction taking place.

$$2Al + 3H_2O \rightarrow Al_2O_3 + 3H_2$$

As a result, hydrogen bubbles from the contact point while the aluminum oxide collects as a white powder in the base of the tank 10. A grid 37 in the bottom of the tank allows the powder to pass through, and then keeps the powder substantially free from currents in the tank 10. The hydrogen passes through the vessel 17 and the orifice 18 to the carburettor of an internal combustion engine.

There may be a tendency for bubbles of hydrogen to adhere to the surface of the drum 19 which rotates in the direction indicated by the arrow 38. To prevent this happening, a wiper blade 39 can be located in the position shown in FIG. 1, so as to separate any adhering bubbles from the drum surface.

Alternatively, a wiper blade 40 may be arranged on the opposite side of the drum. In this case a small volume of hydrogen gas may collect beneath this blade and it may be possible to pivot the blade 40, thus releasing this pocket of hydrogen in order to facilitate start-up of an engine fueled by the hydrogen.

It may be possible to use salt water in the tank 10, rather than fresh water.

The drum 19 preferably rotates at a speed between 400 and 700 rpm, but the rotation may be as slow as 50 rpm.

During operation, the temperature of the water in the tank 10 may rise as high as 95° C., although it is likely that a unit mounted in a moving vehicle, for example, will be able to maintain the water at a lower temperature.

A unit substantially as shown in the drawings has been used to drive a 500 cc motor cycle engine. The wire 22 had a diameter of 1,6 mm and was of commercial purity (98% Al). The unit produced over 1000 cc of hydrogen a minute, with an aluminium wire consumption rate of 140 to 180 cm per minute. The rate of deposition of aluminium oxide was about 4 kilograms per 500 kilometers travelled.

Conventional modifications were made to the carburettor to enable the engine to run on a mixture of hydrogen and air.

The wire 22 carries a voltage of about 18000 volts with a current of about 1 amp.

The invention may equally be used to power stationary industrial engines, as well as motor vehicle engines.

I claim:

1. Apparatus for generating hydrogen comprising:
   a tank for containing water;
   a first metal element and a second metal element disposed in said tank;
   a metal surface of said first metal element being disposed adjacent to a metal surface of said second metal element with the metal substrates of both surfaces being in an electrical circuit to form respective positive and negative electrodes between which an electrical discharge may be made to take place;
   means for moving said metal surface of said first metal element continuously toward said metal surface of said second metal element;
   means for providing a current in said electrical circuit which includes said metal surfaces of sufficient intensity such that an electrical discharge between said positive and negative electrodes occurs causing the metal of at least one of said electrodes to react with water in the vicinity thereof resulting in the formation of a metal oxide and the generation of hydrogen; and
   means for collecting the generated hydrogen.

2. Apparatus as claimed in claim 1, wherein the first metal element is aluminum.

3. Apparatus as claimed in claim 1, wherein the second metal surface is aluminum.

4. Apparatus as claimed in claim 1, wherein the tank is connected to a heat exchanger, so that water can circulate from the tank, through the heat exchanger, and back to the tank.

5. Apparatus for generating hydrogen comprising a tank containing water, a first metal surface and a second metal surface arranged in the tank, said first metal surface being connected to said second metal surface in an electrical circuit to form a positive and a negative electrode between which an electrical discharge may be made to take place, means for moving the first metal surface relative to the second metal surface, means for providing a current in the electrical circuit formed by the connection of the first and second metal surfaces such current being of sufficient intensity that when applied to the circuit, an electrical discharge between the electrodes will occur causing the elctrodes to react with water in the vicinity thereof resulting in the generation of hydrogen and means for collecting the generated hydrogen, and wherein the first metal surface is a wire and the second metal surface is a drum, the drum being mounted for rotation and the wire being supported so that it approaches the cyclindrical surface of the drum at an angle to a tangent to the drum surface.

6. Apparatus as claimed in claim 5, wherein the wire is supported by a device which continuously feeds the wire, as it is consumed, towards the drum surface.

7. Apparatus as claimed in claim 6, wherein means are provided for sensing the pressure of hydrogen gas in the chamber and for regulating the feed rate of the wire feeding device in accordance with the sensed pressure, to control the hydrogen output.

* * * * *